United States Patent
Cugini et al.

(10) Patent No.: US 6,966,668 B2
(45) Date of Patent: Nov. 22, 2005

(54) WEARABLE LIGHT DEVICE WITH OPTICAL SENSOR

(75) Inventors: Mario Cugini, Vista, CA (US); Jeff Brakley, Carlsbad, CA (US); Ralph Giusti, Vista, CA (US); Gioacchino Sarno, Escondido, CA (US); Clement Serafin, Vista, CA (US); Martin Serafin, Mapleton, VT (US); Tracy Rex, Valley Center, CA (US); Jose Ulloa, Escondido, CA (US)

(73) Assignee: NOAH Systems, LLC, Vista, CA (US)

( * ) Notice: Subject to any disclaimer, the term of this patent is extended or adjusted under 35 U.S.C. 154(b) by 172 days.

(21) Appl. No.: 10/703,312

(22) Filed: Nov. 7, 2003

(65) Prior Publication Data
US 2005/0099798 A1 May 12, 2005

(51) Int. Cl.[7] .............................................. F21V 21/08
(52) U.S. Cl. ...................... 362/103; 362/249; 362/276; 362/105; 362/231
(58) Field of Search ................................ 362/103, 105, 362/276, 802, 231; 250/205, 204

(56) References Cited

U.S. PATENT DOCUMENTS

| | | | |
|---|---|---|---|
| 3,774,039 A | * | 11/1973 | Price ........................... 250/552 |
| 3,966,476 A | * | 6/1976 | Becker ......................... 430/568 |
| 4,817,212 A | | 4/1989 | Benoit |
| 4,891,559 A | * | 1/1990 | Matsumoto et al. .......... 315/82 |
| 5,304,813 A | * | 4/1994 | De Man ...................... 250/556 |
| 6,244,721 B1 | | 6/2001 | Rodriguez et al. |
| 6,403,942 B1 | * | 6/2002 | Stam ..................... 250/214 AL |
| 6,497,493 B1 | | 12/2002 | Theisen |
| 6,554,444 B2 | * | 4/2003 | Shimada et al. ............. 362/103 |
| 6,575,588 B2 | * | 6/2003 | Strehl ......................... 362/105 |

\* cited by examiner

*Primary Examiner*—Ali Alavi
(74) *Attorney, Agent, or Firm*—Mary Jo Redman; Calif Tervo

(57) ABSTRACT

Wearable light device for providing additional light for activities in low light includes a wearable mount (20) including a light system (30) and power source (40). Light system (30) includes one or more arrays of light sources such as light-emitting diodes (33). Photo sensor (34) detects ambient light or emitted light returned from a reflective surface and causes control circuit (45) to dim light emission.

21 Claims, 1 Drawing Sheet

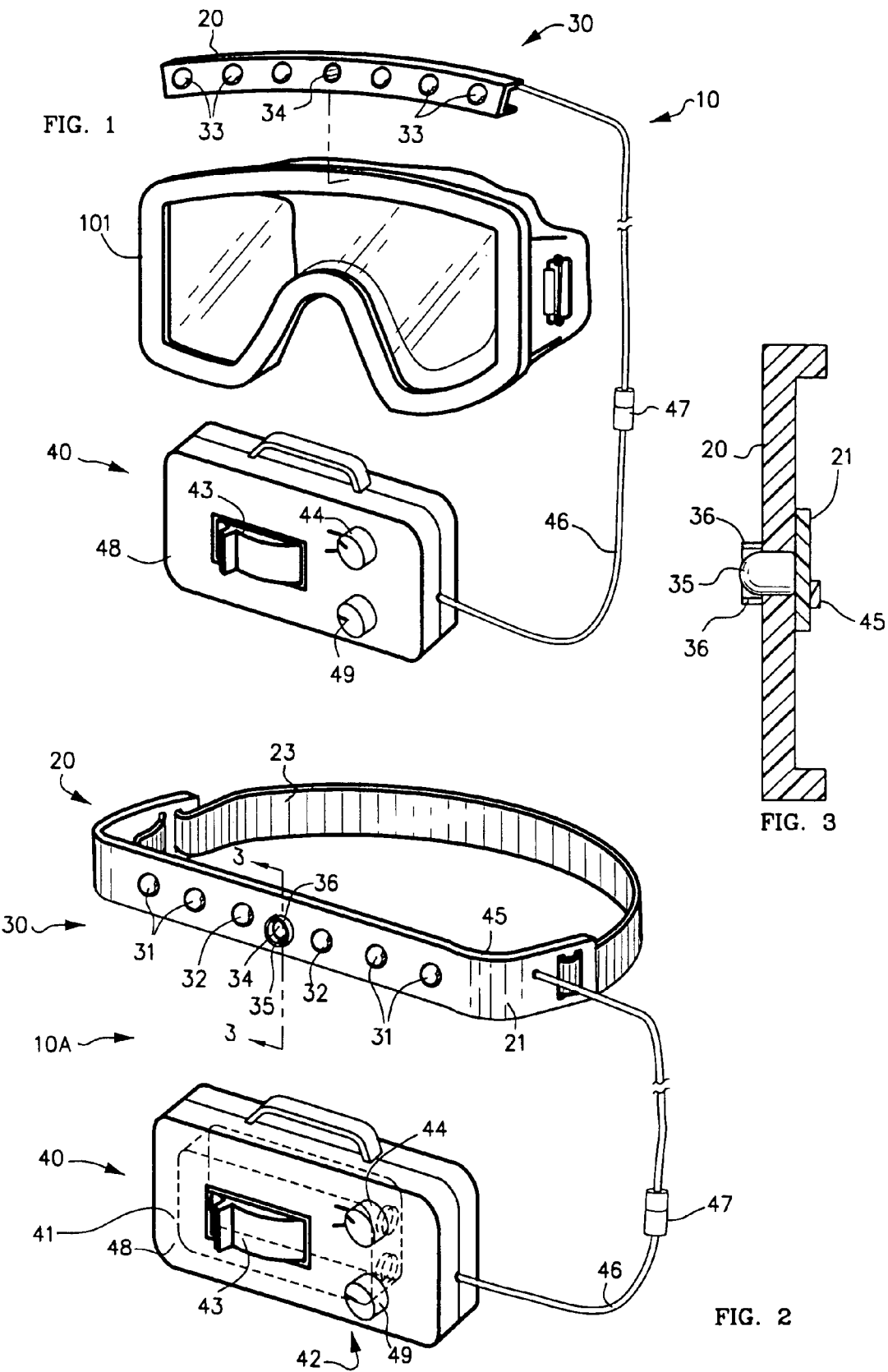

WEARABLE LIGHT DEVICE WITH OPTICAL SENSOR

FIELD OF THE INVENTION

This invention relates in general to portable light devices and more specifically to a wearable light device to enhance vision while participating in activities under low light conditions.

BACKGROUND OF THE INVENTION

It is well known that wearable light devices have advantages over handheld flashlights for night-time activities. A wearable light device leaves both hands free for carrying articles or doing other work, or for simply swinging naturally while running or walking. A light worn on the forehead has the further advantage of illuminating the center of the wearer's field of vision.

A familiar disadvantage of forehead-worn light devices is that, because the main light beam is emitted largely parallel to the direction of gaze, looking toward a reflective surface causes the beam to be reflected directly back into the wearer's eyes. Such reflective surfaces include windows and mirrors, shiny metal surfaces, water, and snow.

To ameliorate this problem, some forehead-worn light devices can switch between two intensity levels of emitted light. Thus, someone wearing a forehead lighting device could switch it to the lower intensity level before leaning over to examine his ski bindings, for example, to avoid being dazzled by reflection from the snow surface. Two intensity levels do not, however, protect a wearer whose gaze unexpectedly crosses a reflective surface, or who forgets to switch levels before looking toward one.

Another familiar disadvantage of forehead-worn lighting devices is the problem of dazzling other persons by looking toward them with the light illuminated. Again, two-levels of light intensity can ameliorate the problem, but only if the wearer remembers to operate the switch before looking at the other person. Even so, the low intensity level may be bright enough to cause a dark-adapted person discomfort and spoil their vision for many minutes.

A wearable lighting device that is useful for high speed sports, such as surfing or skiing, or for seeing long distances, such as route finding while orienteering or rock climbing in darkness or twilight, must emit especially intense light. The bright beam needed for such activities makes the problem of accidentally blinding oneself or others more serious.

There is a long-felt need for a wearable light device that can emit enough light to perform activities normally restricted to either the day time, or to locations with bright artificial lighting, while avoiding the blinding reflective or incident light that is often associated with such lighting devices.

SUMMARY OF THE INVENTION

The invention is a wearable light device to enhance vision at night and in low-light areas. The wearable light device includes a wearable mount for attaching the device to a part of the body. The device includes a light system that includes one or more arrays of light sources such as light-emitting diodes (LEDs), and power source for powering the light system.

The light system further includes one or more photo sensors for detecting ambient light and a dimming circuit for dimming the light produced by the array of LEDs proportionally to the intensity of ambient light. Should the wearer of the wearable light device look at a reflective surface and the light from the array of LEDs be reflected back, the light will be detected by the sensor/s and the dimming circuit will dim the LEDs before the wearer can be dazzled by the reflection. Should the wearer look at another person, who is also wearing a similar wearable light device, the sensors of both devices will respond by dimming their respective lights to a balance that changes as the people's heads move in and out of respective alignment.

Should a second person be carrying a different type of portable light source and aim it at the wearer of the lighting device, the dimming circuit will dim the LEDs to prevent the second person from being dazzled.

The dimming circuit dims the LEDs in response to other ambient light, such as if the wearer walks from outdoor darkness into a lighted building. Dimming the LEDs when their light is not needed conserves the battery or other power source, making it unnecessary for the wearer to remember to turn off the wearable light device manually when in a well-lit area. It also protects other uninvolved people from accidentally being dazzled.

The power source is typically a battery in a suitable housing, the housing preferably adapted to be also worn on the body, such as by being placed in a pocket or attached to the upper arm. The power source further includes an easy disconnect for the power cord connecting the battery to the light system. User controls may be mounted on the power source housing or on the light system to enable the wearer to adjust the output of the light system in various conditions.

The wearable light device is well adapted for use during sports such as skiing or surfing at night or at dusk. Multiple, intense lights provide enough light to aid vision while moving rapidly.

The wearable night vision device can be used for normal activities such as walking, jogging, gardening, or even working in dark places like attics and under floors.

The wearable vision device lighting can include an array of colored lights selected to maximize the response of the human eye when looking at the reflection from different surfaces like snow, concrete, dirt, water, foliage, or other types.

The device is flexible and lightweight; it can be integrated into various items of sports attire, including goggles, bike helmets, or virtual-reality type visors or goggles. It can also be incorporated to various items of every day clothing.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 1 is a preferred embodiment of the wearable light device attached to goggles.

FIG. 2 depicts an alternative preferred embodiment of the wearable light device adapted for wearing on the head or for mounting upon a helmet or hat.

FIG. 3 is a sectional view of the light system of FIG. 2, taken on line 3—3.

DETAILED DESCRIPTION OF THE INVENTION

FIG. 1 is a view of the wearable light device 10 attached to goggles 101. FIG. 2 depicts an alternative preferred embodiment of wearable light device 10A adapted for wearing on the head. FIG. 3 is a sectional view of the light system 30 of FIG. 2, taken on line 3—3.

Device 10 includes a mount 20 for mounting upon an article of clothing, such as a wetsuit, or such as an item of headwear such as goggles 101, or directly upon a body part such as an upper arm or forehead. Optionally, mount 20 can be molded separately, and be worn on the forehead, attached to elastic strap 23, as shown in FIG. 2, allowing light system 30 to remain a separately removable item.

Circuit Board 21 is attached to mount 20 and is for supporting light system 30. Light system 30 typically includes a plurality of light sources, such as light-emitting diodes (LEDs) 33 and at least one photo sensor 34, such as a photodiode 35, photocell, or similar device. In a preferred embodiment, photo sensor 34 would be "photopic," that is, reacting at the same wavelengths and in the same manner as the human eye. Circuit Board 21 is preferably thin and flexible, to adapt to mount 20 contours.

In the preferred embodiment of device 10 illustrated in FIG. 1, all LEDs 33 are mounted such that the light emitted by LEDs 33 is directed in the direction in which the wearer of goggles 101 is looking, in order to illuminate the wearer's field of view and travel path. In another preferred embodiment, envisioned but not illustrated, the outermost lights are aimed a few degrees to the sides, in order to provide better immediate peripheral vision.

Device 10 further includes a power source 40, such as battery 41 contained in housing 48. Battery 41 is connected to light system 30 by a conductor, such as cable 46. Cable 46 optionally includes a disconnect plug 47. For example, if housing 48 were carried in a shirt pocket and mount 20 attached to goggles 101, the wearer could disconnect plug 47 in order to take off goggles 101 but retain housing 48 in the pocket. Disconnect plug 47 also prevents accidental separation of housing 48 from device 10, thereby preventing device damage.

Power source 40 provides electricity to enable circuits to turn on LEDs 33 to emit light and photo sensor 34 to sense light. Power to the lights is provided through control circuit 45, with input from the wearer via user controls 42 such as power switch 43 and optional array selection means 44. Array selection 44 can be alternatively placed in other parts of the device, including as part of plug 47, or even as part of circuit board 21.

Control circuit 45 includes various electronic components mounted on circuit board 21. It provides the driving power to the lights, and modifies the intensity of light emitted by the plurality of light sources, such as LEDs 33, in response to the intensity of light sensed by photo sensor 34. Optionally, photo sensor 34 can include a logarithmic response circuit which converts the photopic linear response of the sensor to a logarithmic response, better matching the eye acuity for light sensing, using a algorithm as is well known in the art.

Typically, control circuit 45 causes the intensity of light emitted by LEDs 33 to decrease as the intensity of light sensed by photo sensor 34 increases. Thus, if the wearer of device 10 should look at a reflective surface, some of the light from device 10 is reflected back toward photo sensor 34 and the wearer's eyes. Control circuit 45 would then respond faster than the human eye to dim the light from LEDs 33 before the wearer is dazzled. Similarly, if the wearer moves into or gazes into a well-lit area, the light produced by device 10 is dimmed.

Photo sensor 34 must be prevented from responding to light coming directly from adjacent LEDs 33, otherwise feedback would cause the intensity of light emitted to oscillate. One means for accomplishing this is installing, or forming a shield 36 to prevent light emitted by LEDs 33 from affecting photo sensor 34. Shield 36 is depicted in FIGS. 2 and 3 as a circular wall around photo sensor 34. Shield 36 can be molded integrally into mount 20 or be formed separately and then attached to mount 20. Other means for preventing feedback will be obvious to one reasonably skilled in the art.

User controls 42 allow the wearer to adjust the response of control circuit 45. Power switch 43 simply connects or disconnects the battery from the light system. Optionally, other controls can allow the wearer to adjust the maximum or minimum intensity of light emitted by LEDs 33, or adjust the threshold of ambient or reflected light sensed by photo sensor 34 that causes control circuit 45 to dim the light emitted by LEDs 33.

Light system 30 of device 10 of FIG. 1 includes a plurality of LEDs that are connected to control circuit 45. Light system 30 of device 10A of FIG. 2 includes a first array 31 and a second array 32 of light sources such as LEDs 33. First and second arrays 31, 32 each include a plurality of LEDs that are controlled separately. For example, first array 31 could include a plurality of LEDs that emit one color of light and second array 32 could include a plurality of LEDs that emit a second color of light. By "color" is meant a wavelength band or combination of wavelengths of light in the visible or near-visible region. Thus, "color" in this specification and claims may refer to a narrow wavelength band such as the color red, or to the combination of wavelengths that produce white light, or even to ultraviolet radiation near the visible range. Optionally, a first array 31 can include certain LEDs 33 positioned for peripheral vision, while a second array 32 can be constructed for far away vision.

Array selection means 44 is a knob, dial, button, sensor, or other means that allows the wearer to select first array 31 or second array 32 to be illuminated, or both. Control circuit 45 preferably controls each array separately and optional adjustment means 49 and array selection means 44 used together allow the wearer to adjust the response of each array 31,32 separately, as is well-known in the art. For example, a wearer might wish to have a first array 31 composed of white LEDs, which dims if even a small amount of reflected or ambient light is sensed by photo sensor 34. At the same time, second array 32 could be composed of red LEDs, which the wearer might choose to have not be dimmed at all by control circuit 45.

Another preferred embodiment, not illustrated, includes a third array of LEDs 33 that would emit light behind the wearer. These lights would warn people behind the wearer of the wearer's presence, as well as direction, and would typically be red in color.

The wearable light device 10 or 10A is flexible and lightweight and can be integrated into most any form of attire wearable on the human body. For example, the vision aid device 10 or 10A may be integrated into various items of sports attire, including goggles, glasses, helmets (e.g., bike helmets), headbands, protective vests, and the like. The vision aid device 10 or 10A may also be integrated into various items of work attire, such as hardhats, protective eyewear, face shields, and the like.

In the embodiment of FIG. 1, the wearable light device 10 is shown being attached to goggles 101. Goggles 101 may be conventional goggles (e.g., skiing goggles, diving goggles, cycling goggles, surgical goggles, and the like), which shield the wearer's eyes from water, snow, sand, dust, blood, and other foreign substances. Optionally, goggles 101 may be goggles used for displaying a computer generated image. Such goggles are found, for example, in so-called augmented reality systems, where a computer-generated image is projected or otherwise superimposed onto the lenses of the goggles with the image appearing in the wearer's view through the lenses of the goggles. The computer-generated image may include, for example, an image that may be useful to the wearer for military, medical, engineering, sporting, and entertainment (e.g., video gaming) purposes. For example, the computer-generated image may include displayed information such as, for example, location, direction, time, and the like. The computer-generated image may also include graphical images such as those found in video game or medical imaging applications.

Where goggles 101 are used to display a computer-generated image, cable 46 may transport data signals between housing 48 and goggles 101. Housing 48 may include an input/output port, such as a wireless signal transceiver or a wiring terminal, for receiving data signals from a computer external to housing 48. Housing 48 may also include an on-board computer (e.g., a microprocessor and related volatile and non-volatile memory) disposed therein for generating data signals. Goggles 101 will include a display device such as a light projecting device, liquid crystal diode (LCD) screen, and the like, which receives the data signals from the external and/or on-board computers via cable 46 and provides the displayed image in the wearer's field of view.

This wearable light device 10 ushers in a new and very broad range of activities, that could never before be performed without the benefits of this invention. These activities are envisioned to create: crowded beaches at night, coastal waters illuminated by night time surfers, dark roads and mountain paths lit up by joggers and hikers, backyards lit by nighttime gardeners, ski slopes and snow capped mountains lit by skiers, snow boarders and alpine skiers. Campgrounds will benefit by being able to perform a new host of night time activities which were restricted to daylight. Skateboarders and cyclists will be able to ride at nights, when their environment is less crowded, and cooler.

Video games will begin to incorporate a wearable night vision mode, implementing these activities permitted by the benefits of this invention.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention

We claim:

1. A wearable light device; including:
   a mount adapted for being worn on the body;
   a light system; including:
      a circuit board;
      a plurality of visible light sources attached to said circuit board for emitting light generally parallel with the wearer's direction of gaze; and
      a light sensor attached to said circuit board for sensing light approaching said sensor;
   a power source for energizing said light sources, said light sensor, including:
      a battery;
      a housing for said battery; and
      a cable connecting said battery and said light system for transmitting electrical energy to said light system; and
   a control circuit for decreasing the intensity of light emitted from said light sources in proportion to the intensity of light striking said sensor.

2. The wearable light device of claim 1; said plurality of visible light sources including:
   a first array of light sources for emitting light of a first color or type;
   a second array of light sources for emitting light of a second color or type; and
   wherein said control circuit is adapted to selectively activate said first array or said second array individually or together.

3. The wearable light device of claim 1, wherein said light sensor is shielded from sensing light emitted directly from said light sources of said light system.

4. The wearable light device of claim 2; said first array consisting of a plurality of light sources for emitting white light; and said second array consisting of a plurality of light sources for emitting light of a different color selected to provide improved vision in the expected environment.

5. The wearable light device of claim 2; said first array consisting of a plurality of light sources for emitting red light disposed on said mount such that the red light emitted by said first array is directed behind the wearer for alerting persons behind the wearer to the wearer's location and direction of movement.

6. The wearable light device of claim 1; said mount being adapted for being attached to an article of headgear.

7. The wearable light device of claim 1; said mount being adapted for being attached to a garment.

8. The wearable light device of claim 1; said mount being adapted for wearing upon the head.

9. The wearable light device of claim 1; said housing being adapted for wearing upon a part of the body.

10. The wearable light device of claim 1; said housing being adapted for being attached to an article of clothing.

11. The wearable light device of claim 1, said device adapted for use in a simulation game.

12. A wearable light device; including:
    a mount adapted for being worn on the body;
    a light system; including:
       a circuit board;
       a first array of light sources attached to said circuit board for emitting light of a first color generally parallel with the wearer's direction of gaze;
       a second array of light sources attached to said circuit board for emitting light of a second color; and
       a light sensor attached to said circuit board for sensing light approaching said sensor;
    a power source for energizing said light sources; including:
       a source of electricity; and
       a cable connecting said source of electricity and said light system for transmitting electrical energy to said light system; and
    a control circuit for decreasing the intensity of light emitted from said light sources in proportion to the intensity of light striking said sensor; and wherein: said light sensor is shielded from sensing light directly emitted from said light sources of said light system.

13. The wearable light device of claim 12, said control circuit including:
    a power switch for selectively stopping said conductor from transmitting electrical energy from said source of electricity to said light system; and at least one response control means for selecting the desired output of said control circuit.

14. The wearable light device of claim 13, said response control means including:
array selection means such that said control circuit can provide different outputs to said first array and said second array in response to a single input from said light sensor.

15. The wearable light device of claim 12; said light system and said power source further adapted for use in outdoor sports by being substantially waterproof.

16. The wearable light device of claim 1, said wearable light device adapted for video games, and video game modes.

17. The wearable light device of claim 1, said wearable light device to include a photopic light sensor.

18. The wearable light device of claim 1, said wearable light device to include a logarithmic response to drive the light output intensity and match the human eye.

19. A light device wearable on a human body, the light device comprising:

a mount configured to be worn on the human body;

a plurality of visible light sources disposed on the mount for emitting light generally parallel with the wearer's direction of gaze; and a light sensor disposed on the mount, wherein light emitted by the plurality of visible light sources is adjusted in response to an intensity of light incident on the light sensor.

20. The light device of claim 19, wherein an intensity of the light emitted by the plurality of visible light sources is decreased in response to an increase in the intensity of light incident on the light sensor.

21. The light device of claim 19, wherein the intensity of the light emitted by the plurality of visible light sources is increased in response to a decrease in the intensity of light incident on the light sensor.

* * * * *